May 22, 1962 H. KNOWLES 3,035,631

HEATING TIP FOR WELDING OF PLASTICS

Filed June 9, 1961

INVENTOR.
HOWARD KNOWLES

BY *William F. Mesinger*

ATTORNEY

United States Patent Office 3,035,631
Patented May 22, 1962

3,035,631
HEATING TIP FOR WELDING OF PLASTICS
Howard Knowles, Fort William, Ontario, Canada, assignor to Union Carbide Canada Limited, Toronto, Ontario, Canada, a corporation
Filed June 9, 1961, Ser. No. 116,132
4 Claims. (Cl. 156—579)

This invention relates to an improved tip for welding plastics and more particularly to an improved tip for joining polyvinylchloride in any type joint.

In the past, in order to join polyvinylchloride either gas or electric hot plates were used to heat the edges of the plastic before such edges were pressed together. This method was cumbersome, the plastic had to be brought to the hot plate to be heated and further some types of joints, such as T-joints, could not be made.

Accordingly, it is a main object of the invention to provide a completely portable tool capable of making all types of plastic joints in place.

Other objects are: To provide an improved heating tip for joining plastics; to provide a heating tip for joining polyvinylchloride; to provide a heating tip which will greatly reduce the time necessary to make a polyvinylchloride joint.

Figure 1:
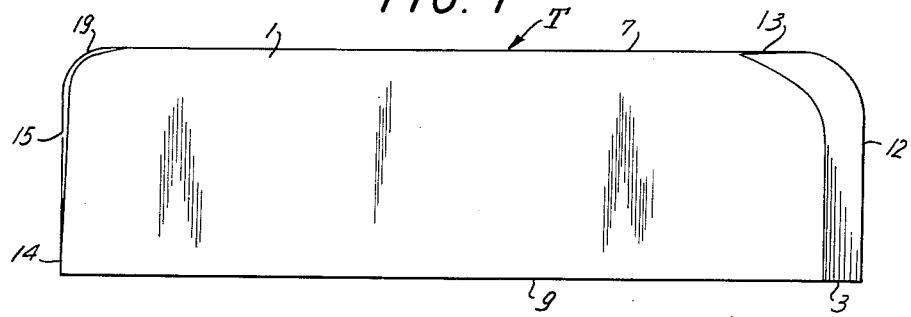
Figure 2:
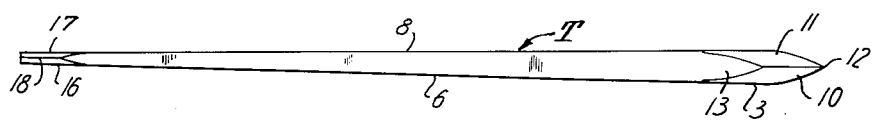
Figure 3:
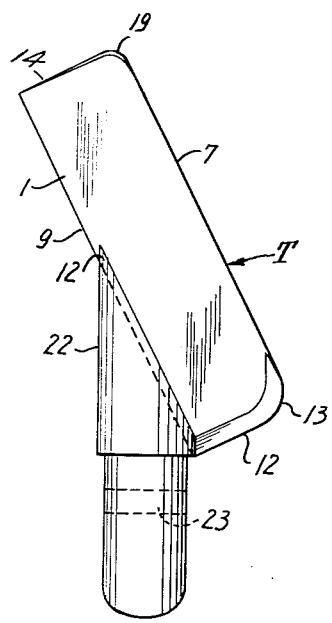
Figure 4:
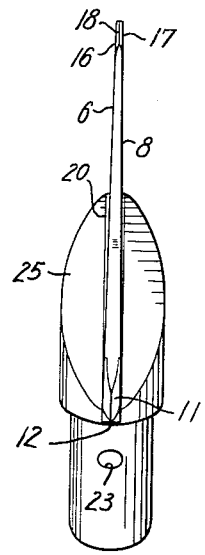
Figure 5:
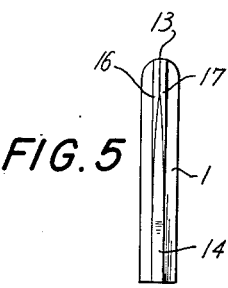
Figure 6:
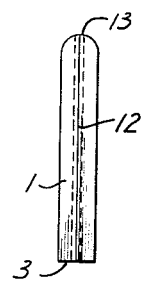

Additional objects will become apparent from the following description and drawings in which:

FIGURE 1 is a side elevation view of the inventive tip;
FIGURE 2 is a plan view;
FIGURE 3 is a side elevation view of the inventive tip in a tip holder;
FIGURE 4 is a front elevation of the inventive tip in a tip holder;
FIGURES 5 and 6 are left and right hand side views respectively of the tip shown in FIGURE 1.

In a general way the objects of the invention are accomplished by providing a tip for heating plastic comprising an elongated body having a thick end and a thinner end, the body being tapered from the thick end to the thinner end and the ends being shaped to provide a knife edge at each extremity of the body.

Referring to the drawings and particularly FIGURE 1, the tip noted generally at T has an elongated body 1. The body 1 has a thick end 3 and a thin end 5. Body 1 has front and back surfaces 6 and 8 respectively tapering from the thick end to the thin end, and a flat top and bottom surface 7 and 9 respectively. Top surface 7 is rounded off along the edges where top surface 7 meets front surface 6 and back surface 8. (See FIGS. 5 and 6.) The thick end 3 is provided with oblique surfaces 10 and 11 cut into the front surface 6 and back surface 8 of the body 1. The oblique surfaces 10 and 11 come together to form a knife edge 12 at the extremity of the body 1. Top surface 7 of body 1 has a curved section 13 which forms the curved top surface of the thick end 3. At the thin end 5 of the body 1 there is provided a flat side surface 14 (see FIG. 5) which extends from the bottom surface 9 part way up to the top surface 7 of the body 1. The top portion 15 is formed from oblique surfaces 16 and 17 cut into the front surface 6 and the back surface 8 of body 1. The oblique surfaces 16 and 17 come together to form a knife edge 18. As was the case at the thick end, the top surface of body 1 has a curved section 19 which forms the curved top surface of the thin end 5.

In operation the tip T is secured in an appropriate handle provided with means for heating such tip. The tip may be heated by a gas flame or by an electrical heating element.

Referring to FIGURE 3, the bottom surface 9 of tip T is fitted into a groove 20 (see FIG. 4) provided in tip holder 22. Tip holder 22 is provided with a bolt hole 23 through which a bolt may be passed to secure the tip holder 22 on an appropriate handle. Preferably, the groove 20 is adapted to receive the bottom surface 9 from approximately the midpoint thereof to the thick end 3 so that the knife edge is flush with the end of the groove 20. The groove 20 is cut in a surface 25 inclined at an acute angle with the longitudinal axis 30 of the tip holder 22. The most desirable angle has been found to be about 27 degrees. Consequently, when the tip T is soldered to groove 20, the longitudinal axis 30 of tip T and the longitudinal axis of holder 22 form an acute angle A.

A tip of the type described is admirably suited to the welding of polyvinylchloride especially in cramped spaces. Excellent welds were made by inexperienced operators very quickly with the inventive device.

In order to make a weld with the tip described, the tip is heated. Good results have been obtained when the tip is at approximately 500° F. The instrument is held like a knife with the thick end 3 having the knife edge 12 leading. The instrument is applied to the joint to be made between the polyvinylchloride parts and is drawn toward the operator. As a result, the thick end separates and heats the surfaces to be joined. As the tip moves through the joint it continues to heat the plastic surfaces. When the thin end passes through the joint, it not only heats the plastic but will induce the molten surfaces to flow together to form a good plastic joint. The tip thus has the advantage of providing a way of inducing the molten plastic surfaces to run together immediately after heat is applied. Heretofore, the plastic was heated and then pressed together. Consequently, heat was lost between the time the heat source was withdrawn till the time the surfaces were pressed together.

Since many varied embodiments of the invention may be made without departing from the basic concept of the invention, it is to be understood that the invention is not limited by the specific embodiments described, but covers all devices that come within the spirit of the invention.

What is claimed is:

1. A tip for heating plastic comprising an elongated body having a thick end and a thinner end, said body being tapered from said thick end to said thinner end and said ends being shaped to provide a knife edge at each extremity of said elongated body.

2. A tip for welding plastic comprising an elongated body having a thick end and a thinner end, said body being tapered from said thick end to said thinner end, said thick end having a curved top surface and oblique front and back surfaces coming together to form a knife edge at one extremity of said elongated body, said thinner end having a curved top surface, a flat side surface, oblique front and back surfaces extending from said flat side surface to said curved top surface to form a knife edge at the upper portion of the other extremity of said elongated body.

3. A head for welding plastics including a tip comprising an elongated body having a thick end and a thinner end, said body being tapered from said thick end to said thinner end, said thick end having a curved top surface and oblique front and back surfaces coming together to form a knife edge at one extremity of said elongated body, said thinner end having a curved top surface, a flat side surface, oblique front and back surfaces extending from said flat side surface to said curved top surface to form a knife edge at the upper portion of the other extremity of said elongated body, a tip holder provided with means for receiving and holding said tip at an acute angle measured between the longitudinal axis of said tip holder and the longitudinal axis of said tip.

4. Apparatus according to claim 3, wherein said acute angle is in the order of about 27 degrees and said tip holder is provided with a groove for receiving at least a portion of the bottom surface of said tip from approximately the midpoint to the thick end thereof.

No references cited.